United States Patent
Gonzaga

(10) Patent No.: US 6,880,606 B2
(45) Date of Patent: Apr. 19, 2005

(54) BEAD RELEASING AND TIRE DISASSEMBLING GROUP IN A TIRE ASSEMBLING-DISASSEMBLING MACHINE

(75) Inventor: Tullio Gonzaga, Correggio (IT)

(73) Assignee: Bulter Engineering & Marketing SRL, Rio Saliceto (IT)

( * ) Notice: Subject to any disclaimer, the term of this patent is extended or adjusted under 35 U.S.C. 154(b) by 22 days.

(21) Appl. No.: 10/353,633

(22) Filed: Jan. 29, 2003

(65) Prior Publication Data

US 2003/0150565 A1 Aug. 14, 2003

(30) Foreign Application Priority Data

Feb. 12, 2002 (IT) .................................... VR2002A0013

(51) Int. Cl.[7] .......................................... B60C 25/132
(52) U.S. Cl. ..................................... 157/128; 157/1.24
(58) Field of Search ................................ 157/1.17, 1.2, 157/1.21, 1.22, 1.24, 1.26, 1.28

(56) References Cited

U.S. PATENT DOCUMENTS

| 4,047,553 | A |   | 9/1977  | Kotila         |          |
|-----------|---|---|---------|----------------|----------|
| 4,615,370 | A | * | 10/1986 | Cuccolini      | 157/1.24 |
| 5,226,465 | A | * | 7/1993  | Schon et al.   | 157/1.28 |
| 6,422,285 | B1| * | 7/2002  | Gonzaga        | 157/1.24 |

FOREIGN PATENT DOCUMENTS

| DE | G 91 01 930 U | 6/1991 |
| EP | 0 042 363 A1 | 12/1981 |
| EP | 1 052 120 A1 | 11/2000 |

* cited by examiner

Primary Examiner—Debra S. Meislin
(74) Attorney, Agent, or Firm—R. Neil Sudol; Henry D. Coleman; William J. Sapone

(57) ABSTRACT

A group for assembling, disassembling and bead releasing of a tire (2) onto and from a wheel-rim (3) supported mounted for rotation about an axis and having at least a carriage or slid (4) displaceably mounted on guides (5) extending parallel to the axis of rotation of the wheel-rim (3), an arm or upright (6) extending in a transverse direction with respect to the said axis of rotation and having one end thereof supported by the slide or carriage (4) and its other end provided with a bead releasing tool (7, 8) that can be arranged so as to have its working front or edge (107, 108) facing towards the same side. First driving means (9), designed to cause the arm (6) to rotate about a longitudinal axis (x—x) for positioning the bead releasing disk (7) and the tool (8) with respect to the sides of the tire (2), and second driving means (10), designed to effect the rotation of the said arm (6) about at least one axis (y—y) extending transversely with respect to said longitudinal axis, are also provided, thereby lifting or lowering, upon control, the bead releasing disk (7) and the tool (8) with respect to the displacement of the slide or carriage (4) along the guides (5) for overtaking the wheel-rim (3) or tire (2).

17 Claims, 6 Drawing Sheets

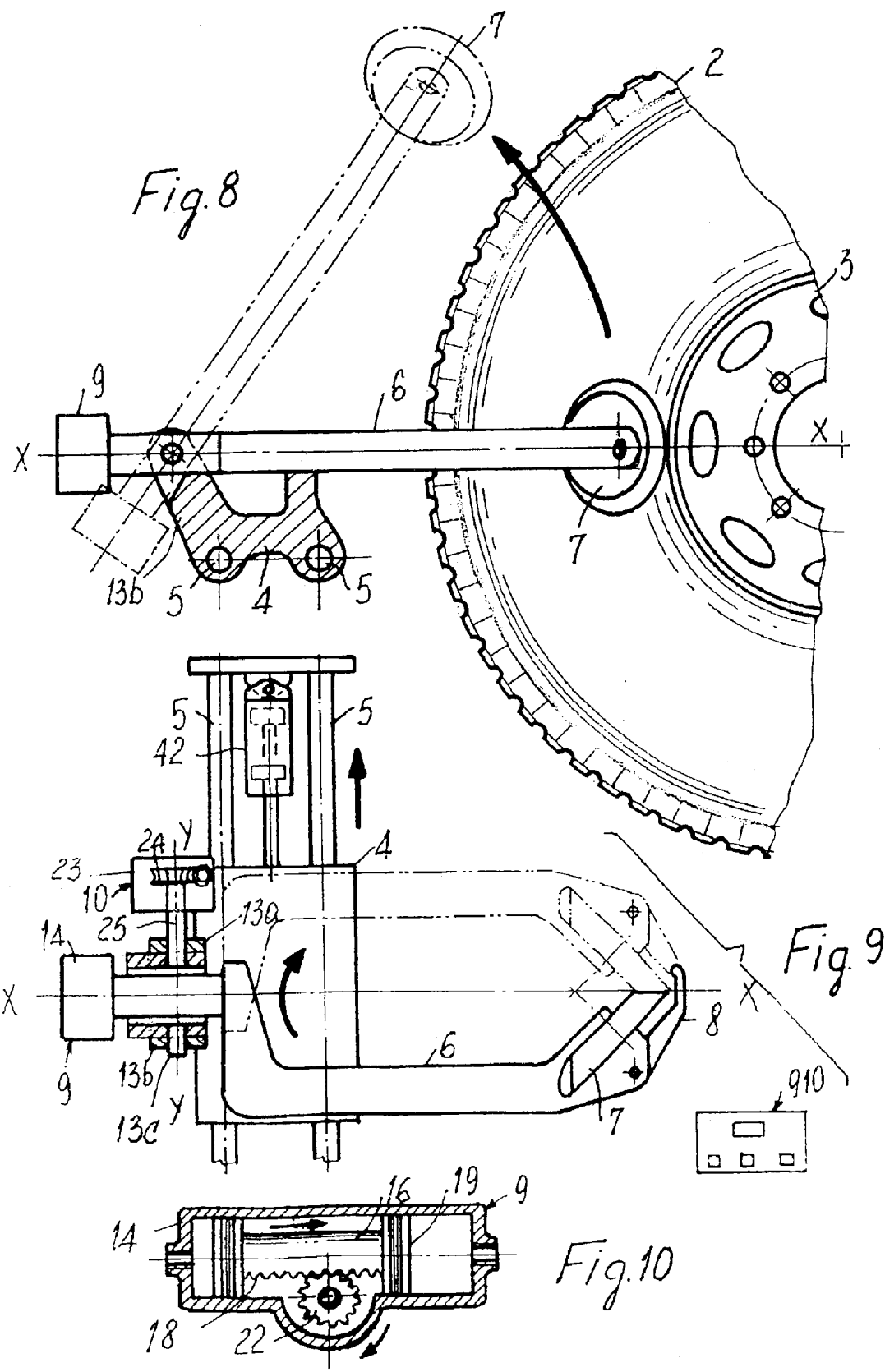

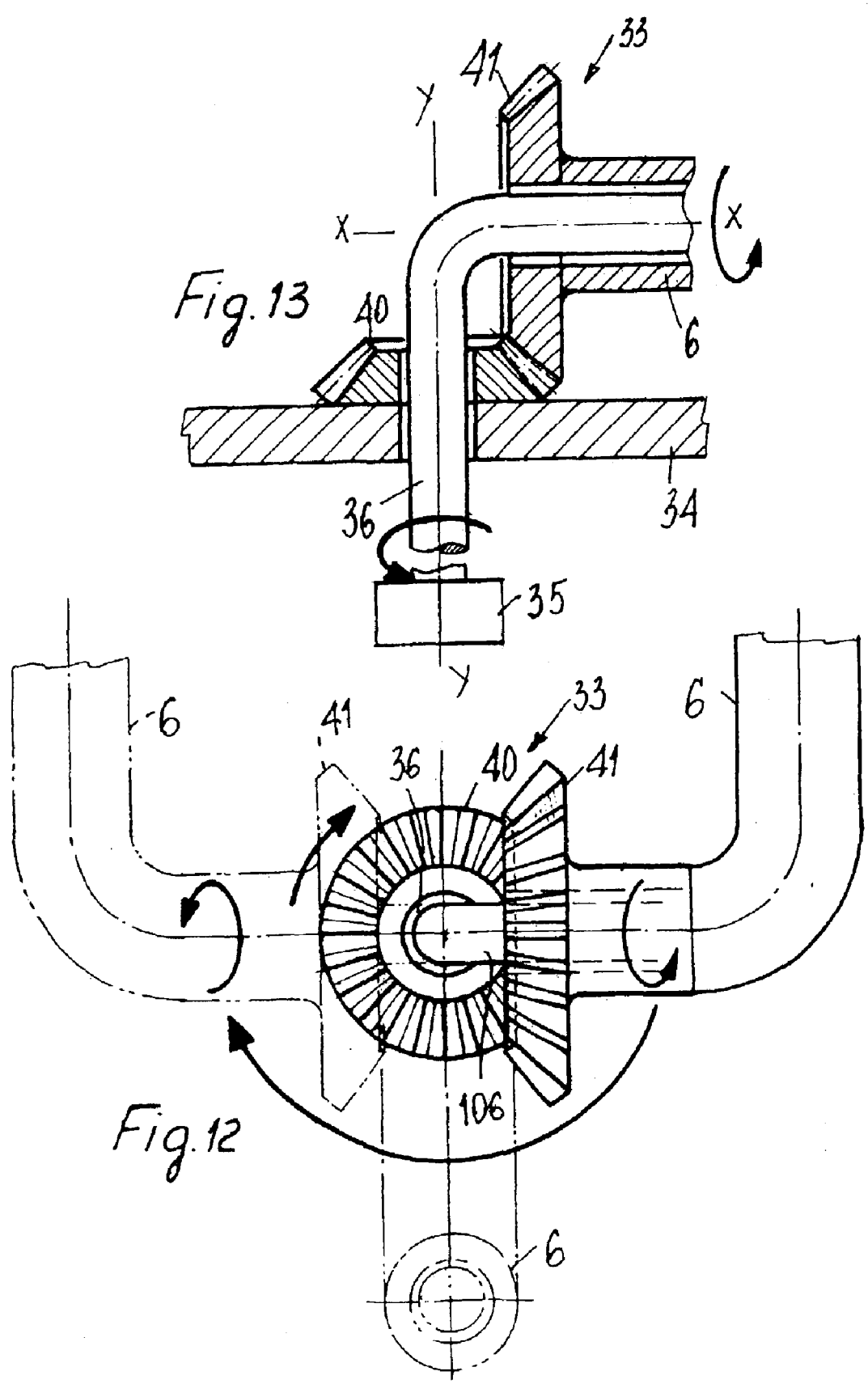

BEAD RELEASING AND TIRE DISASSEMBLING GROUP IN A TIRE ASSEMBLING-DISASSEMBLING MACHINE

BACKGROUND OF THE INVENTION

The present invention relates to a bead releasing and tire disassembling apparatus for disassembling tires from wheel-rims, particularly for use in tire disassembling machines.

Tire disassembling machines provided with tools for fitting, bead releasing and removing tires from their wheel-rims for vehicles with relatively large tired wheels, such as earthworks vehicles, have been known and used for quite a long time. Such tools are mounted e.g. at the end of an upright or "pole" rising from a carriage alternately displaceable in a direction parallel to the axis of rotation of the wheel-rim.

A tire disassembling machine for large tired vehicles generally comprises a base frame supporting two parallel overhanging arms suitable for being moved together, and away from, each other. One arm supports a suitable engagement and support means for the wheel-rim, e.g. a self-centring assembly, whereas the other arm, which is generally telescopic, supports a tool assembling/disassembling a tire onto or from its respective wheel-rim.

The said carriage supports a suitable tool used in the assembling or disassembling operation and can be displaced on guides close to the wheel or wheel-rim. For example, should the operator disassemble a tire from a wheel-rim, after deflating the tire, he displaces the carriage to move it in front of a wheel face and positions the bead releasing tool arranged at the top of the upright carried by the carriage, by adjusting the position of the carriage and the length of the upright according to the size of the wheel-rim.

The tool preferably comprises a disk or roller substantially conical in shape that is supported free to rotate on the upright or mandrel about an axis inclined with respect to the longitudinal axis of the mandrel and has a rounded larger peripheral edge designed to abut against the tire; as well as a curved removing tool arranged to be diametrically opposite and close to the disk, so that by rotating the tool through 180°, either the disk or the removing tool can be brought to its working position. However, the disk and the removing tool can also be mounted on two different uprights so that either of them can be brought to its working position.

Once said preliminary tool positioning operation has been completed, the operator positions the carriage in such a way that the edge of the conical disk thrusts the tire-bead which, after setting in rotation the self-centring device, and thus the wheel, is forced progressively to detach or to be released from the peripheral delimiting edge of the wheel-rim. The operator must then cause the carriage to be moved away from the wheel in order to allow the tool to rotate on itself through 180° to bring the removing tool to its working position. Each time the tool is rotated a locking means is released which normally comprises a pin transversely fitted in a through hole formed in the upright and in the base of the tool, and the pin is to be inserted in position. Once the tool has been rotated and locked in position, the carriage is to be once again moved close to the wheel to carry out the removal operation of the bead that has just been released.

The operator then effects bead releasing on the other side of the tire. In order to do so he must first release and move away the tool from the bead already released and removed from the first side, he then causes the upright to rotate about its vertical axis, in order to avoid to interfere with the wheel mounted on the self-centring device, and the carriage to effect a stroke sufficient to move the upright to the other side of the tire; the tool is then once again positioned by being rotated about vertical axis of the upright, in order to set the disk in its working position.

The bead on the second side or front of the tire is then released by acting in a way similar to that at the first front or side. The tool is rotated to position the removing tool so as to be facing towards the tire, whereby proceeding with the removal also of the second bead which has just been released; after which the carriage must be moved away from the wheel-rim.

All operations are carried out almost entirely manually and thus they are quite complicated, laborious, hence tiresome for the operator and require relatively long periods of time for being carried out correctly.

Additionally, since the tool comprises the bead releasing disk and the removing tool arranged diametrically opposite to each other, it is relatively cumbersome. Normally the overall dimensions of the tool exceeds 30% of the width of the wheel, and thus adequate space must be provided to carry out the operations of assembling and disassembling a tired wheel. This means that, in order to operate on wheels of relatively large dimensions (with a diameter up to 1.5 m), and bearing in mind that it is necessary to operate on both sides of a wheel, the tire assembling/disassembling machine must allow the tool-supporting carriage to effect strokes more than 2 m long.

SUMMARY OF THE INVENTION

The main object of the present invention is to eliminate the shortcomings referred to above by providing a bead releasing and tire disassembling group designed to act on tires having relatively large dimensions to be assembled on, or disassembled from a wheel-rim fixed on a rotatable support, the group being suitable for reducing in number and simplifying the operations and the manoeuvres to be carried out by an operator, thereby allowing the operator to carry out the tire assembling, bead releasing and disassembling operations in an expeditious and effortless way.

According to a first aspect of the present invention there is provided a tire assembling, disassembling and bead releasing apparatus arranged to assemble a tire on, or disassemble it from a wheel-rim supported on a support mounted for rotation about an axis, comprising at least one carriage or slide means displaceable on guides extending parallel to the axis of rotation of the wheel-rim, an arm or upright extending in a direction transverse to the said axis of rotation and having one end thereof supported by the said slide or carriage and its other end provided with a bead releasing tool, wherein the said bead releasing tool is positioned so as to have a working edge or front facing towards said wheel-rim or tire, first driving means designed to cause said arm or upright to rotate about a longitudinal axis for positioning said bead releasing tool with respect to the sides of said tire, and second driving means designed to cause said arm to rotate about at least one axis transversely extending with respect to said longitudinal axis, thereby lifting or lowering, upon control, said bead releasing tool with respect to said wheel-rim or tire in sequence with respect to the displacement of said carriage along said guides in order to overtake said wheel-rim or tire.

According to another aspect of the present invention there is provided a method of bead releasing and disassembling a tire from a wheel-rim mounted on a rotatable mandrel of a wheel disassembling machine having a carriage displaceable on guides parallel to the axis of rotation of the said wheel-rim, and arm extending from said carriage, a bead releasing disk and a removing tool carried by said arm and having their working fronts or edges that can be positioned to face towards the same side, characterized in that it comprises the following steps:

bringing said working edges or fronts facing a first side of said tire, releasing the bead of said tire at said first side thereof by means of said bead releasing disk, removing the said first tire bead from said wheel-rim by means of said removing tool, causing said arm to overtake said tire to displace it to the second side of said tire, said bead releasing disk and said removing tool having their working fronts facing towards said second side of said tire, releasing the bead of said tire at the second side thereof by means of said bead releasing disk, and removing said second tire bead from said wheel-rim by thrusting action of said removing tool in order to remove said bead from the first side of said wheel-rim.

BRIEF DESCRIPTION OF THE DRAWINGS

Further aspects and advantages of the present invention will be better apparent from the following detailed description of some preferred, but not exclusive embodiments of a tire assembling/disassembling and bead releasing group or apparatus arranged to assemble a tire on, and disassemble it, from a wheel-rim mounted for rotation on a mandrel of a tire assembling/disassembling machine, illustrated by way of not limiting example in the accompanying drawings, in which:

FIG. 8 is a diagrammatic side view of a tire bead releasing and removing group of FIG. 7 while effecting bead releasing of on one side of the tire and overtaking the tire so as to be moved to the other side of the tire;

FIG. 9 is a diagrammatic top plan view of the group according to the present invention shown in FIG. 8;

FIG. 10 shows a cross-section view on an enlarged scale of a modification of the first driving means with respect to the embodiment shown in FIG. 6;

FIGS. 12 and 13 show cross-section views from the top and from the bottom, respectively, of another embodiment of driving and transmission means arranged to cause the tool-carrying arm to follow a tire overtaking path.

DESCRIPTION OF THE PREFERRED EMBODIMENTS

Figure 1:
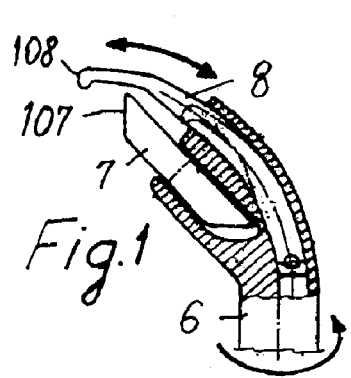
FIG. 1 shows a diagrammatic side view with parts in section of a bead releasing tool together with a removing tool both positioned facing towards the same side to make so as to constitute a component of a bead releasing group according to the present invention.
Figure 2:
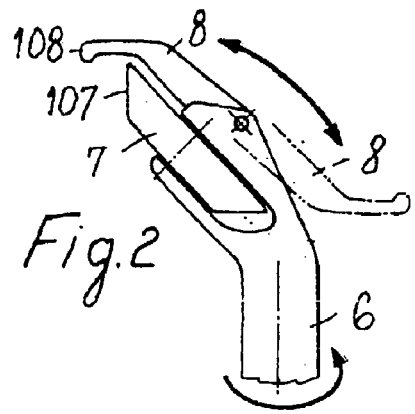
FIG. 2 is a diagrammatic side view of a modification of a bead releasing and removing tool of the bead releasing group according to the present invention.

With reference first to the above listed FIGS. 1 to 10, an assembly for bead releasing and removing group or apparatus, generally designated at 1, arranged to remove a tire 2 from its respective wheel-rim 3 removably fixed onto a mandrel, which is preferably a component of a self-centring assembly of a tire disassembling machine, not shown, in particular a tire disassembling machine for large tires, e.g. those for agricultural machinery, earthmoving machines and the like.

Tire disassembling machines for relatively large tires are normally provided with a carriage or slide 4 that is slidably mounted on a pair of guides 5 extending parallel to the axis of rotation of the wheel-rim 3 and thus of the mandrel or self-centring assembly. An arm or upright 6 rises from carriage 4; which at its upper free end supports a tool comprising a freely rotating bead releasing disk 7 designed to release the beads of tire 2 from the edges of wheel-rim 3, and a removing tool 8 for removing the bead released from the wheel-rim.

The active front 107 and 108, respectively, of the bead releasing disk and of the removing tool are adjustable so as to be faced towards the same side of the tire. More particularly, the removing tool can be a curved removing tool pivoted in a position adjacent to the bead releasing roller or disk 7 (FIG. 2), so as to be angularly displaceable between a working position with its active front 108 facing towards the wheel-rim 3 and a rest position away from the working position, as disclosed in Italian patent application number VR99A00048 filed on 19, 05, 1999 (May 19, 1999) in the name of the applicant of the present invention.

Alternatively, the removing tool 8 can be a lengthening and shortening type (FIG. 1) and the removing tool is suitable for being lengthened and shortened between a working position and a rest position. To this end, the removing tool is provided with driving means, e.g. a jack, a rack, or the like. A tool of this type is described and illustrated in Italian patent application number VR2001A000124 filed on 22, 11, 2001 (Nov. 22, 2001) in the name of the applicant of the present invention.

Between arm 6 and movable carriage 4, first driving means 9 is provided to control rotation of arm 6 about its longitudinal axis x—x, or about an axis parallel thereto, as well as second driving means 10 to control rotation of arm 6 about one or more transverse axes y—y, e.g. an axis normal to longitudinal axis x—x. The combined action of the driving means 9 and 10 makes it possible to position the working edges or fronts 107 and 108 so as to be always facing towards tire 2 (preferably in a perfectly symmmetrical arrangement—FIG. 7) when arm 6 is displaced to one side or and to the other of the tire.

In the preferred embodiment, axes x—x and y—y extend substantially normal to each other and transverse axis y—y preferably intersects the base of arm 6.

The first driving means 9 designed to cause arm 6 to be rotated about axis x—x comprises a support sleeve 13 (FIGS. 6 and 7) pivoted, as further described below, to the movable carriage 4, and a box-like receiving seat 14 that is rigidly secured to support 13 and in communication therewith. Within receiving seat 14 a worm reduction unit 15 is housed comprising a transverse lead screw 16 mounted for rotation in the receiving seat 14, and a driven gear 17 having its axis coaxial with that of the support sleeve 13. Gear 17 is rigid in rotation with the lower end 106 of arm or upright 6 which, in turn, is mounted for rotation in the support sleeve 13 and extends into seat 14.

Figure 4:
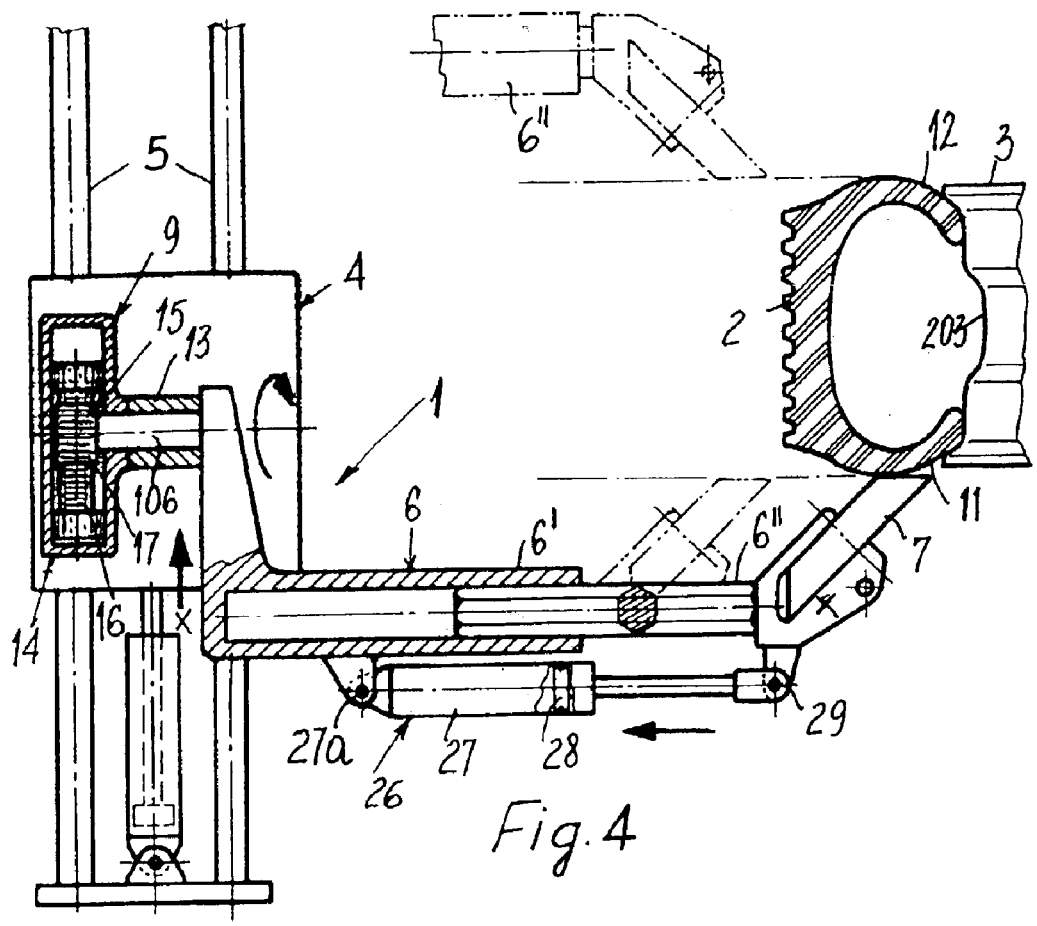
FIG. 4 shows a top plan view of a bead releasing and tire disassembling group according to the present invention provided with an arm carrying a bead releasing and removing tool according to a first embodiment of the invention.
Figure 6:
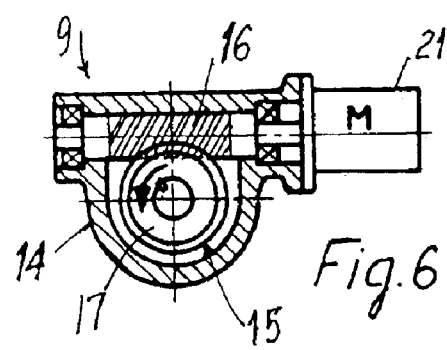
FIG. 6 is a cross-sectional view taken along line VI—VI of FIG. 5.
Figure 5:
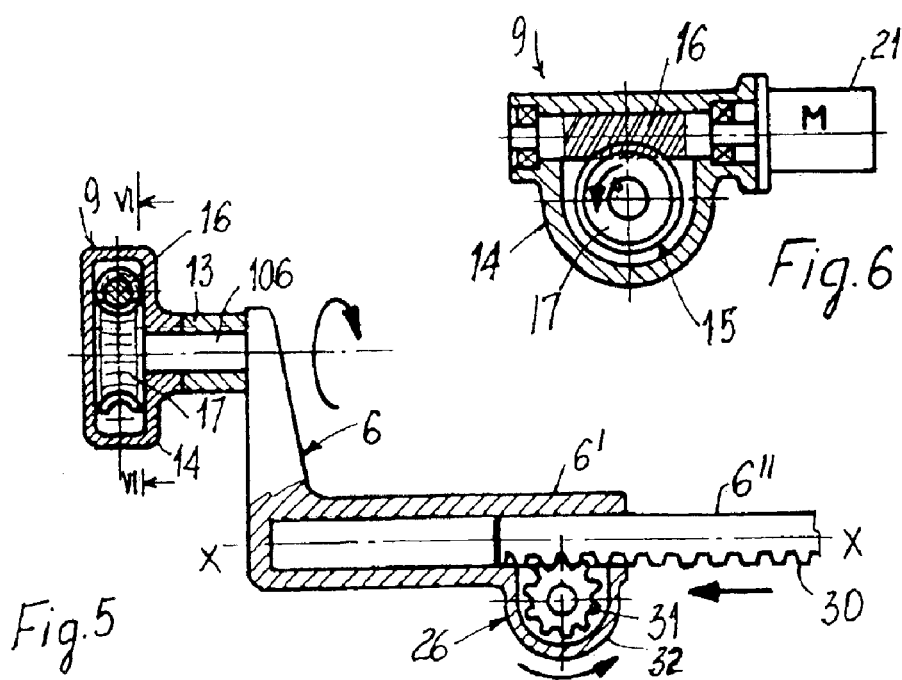
FIG. 5 illustrates a diagrammatic detailed view of a second embodiment of an arm carrying a bead releasing and removing tool according to the present invention.
Figure 11:
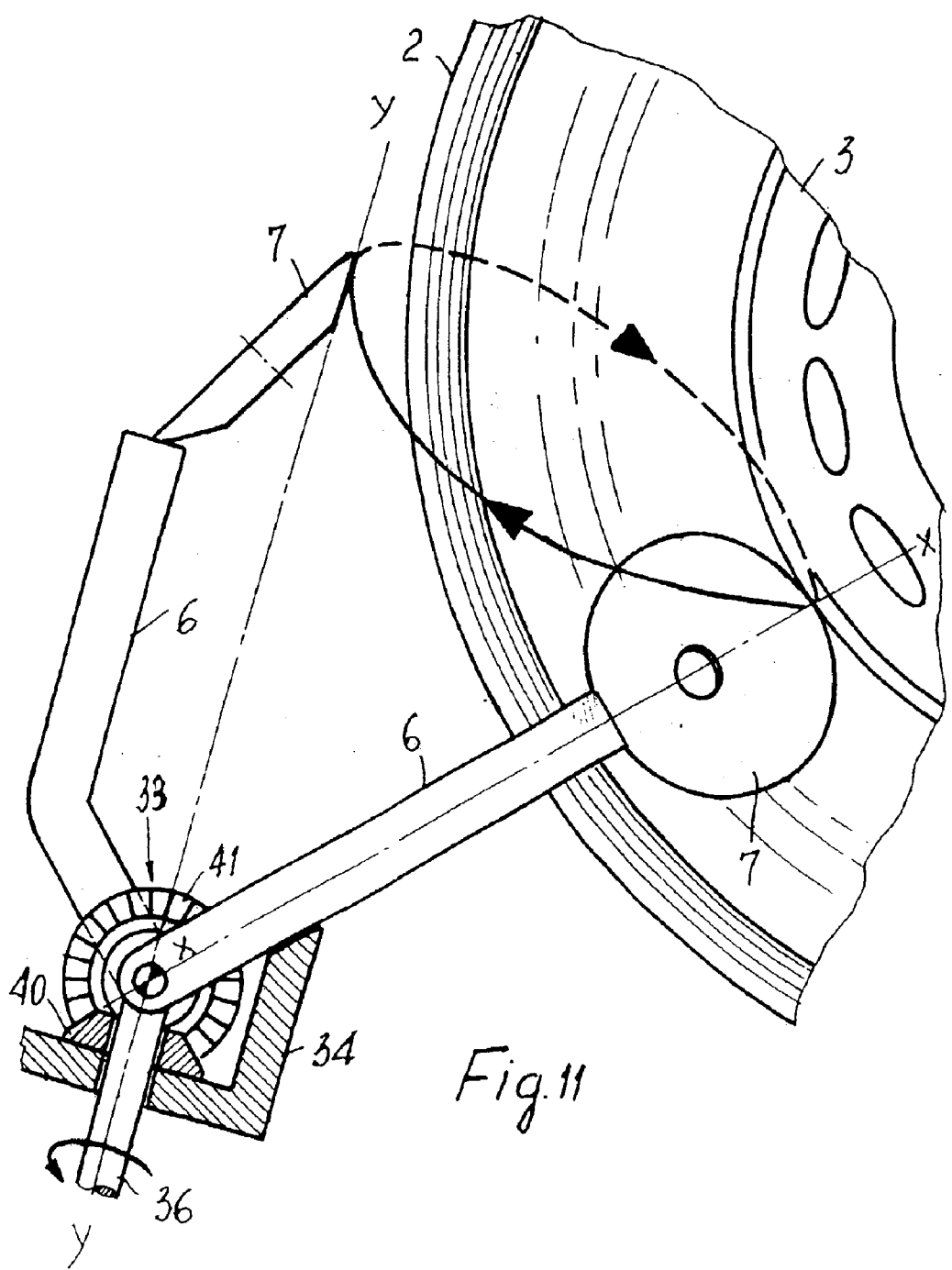
FIG. 11 shows a diagrammatic perspective view with parts in cross-section of another embodiment of the driving means for changing front with by overtaking the tire.

As it is better shown in FIGS. 4 and 5, the lower end 106 is part of an end portion shaped as a double crank or throw of the arm or upright 6 and extends parallel to arm 6 itself, whereby a rotation of the driven gear 17 results in a respective rotation of end 106 and in a displacement-rotation of arm 6 about the axis of rotation of gear 17 and end 106.

The lead screw member 16 can be controlled e.g. by an assembly 21 (FIG. 6) formed by a reversible electric motor and a reduction unit and is preferably supported by the receiving seat 14.

In the embodiment shown in FIG. 10 the lead scew member comprises a rack 18 that is slidingly mounted in the receiving seat 14 to be displaced to and fro by a linear actuator e.g. a double-acting cylinder and piston assembly 19 the cylinder of which constitutes the seat 14 itself.

The driving means 10 arranged to cause the arm 6 to be rotated about axis "Y" comprises (FIGS. 8 and 9) a motor-reduction unit 24 and a support housing 23, which is carried by the movable carriage 4 and accommodates the motor-reduction unit 24. A output shaft 25 extends from the housing, is driven by a motor-reduction unit 24, and is fixed, e.g. welded, to the head of the support sleeve 13 so as to cause it to rotate about an axis y—y perpendicular to the longitudinal axis of sleeve 13. To this end, sleeve 13 is supported, e.g. by a pair of lugs 13a, 13b one of which supports shaft 25 and the other a pin 13c arranged in axial alignment with shaft 25.

The arm or upright 6 (FIGS. 4 and 5) is preferably adjustable in length, e.g. it has two straight telescopic sections 6' and 6", one of which can be controlled by a linear actuator 26. The linear actuator 26 comprises e.g. a cylinder 27 and piston 28 fluid operated assembly having one end, e.g. a portion of its cylinder 27, articulated at 27a to section 6', whereas its other end, i.e. that of its stem fixed to piston 28, is articulated at 29 to section 6", so that an extension or contraction of the assembly 27 results in a lengthening or shortening, respectively, of arm 6.

FIG. 5 illustrates another embodiment of a linear actuator 26 comprising a rack 30 whose toothing is preferably formed directly on section 6" of arm 6, a pinion 31 mounted for rotation on section 6' and in meshing engagement with rack 30, and a motor-reduction unit, generally designated at 32, comprising e.g. a reversible electric motor and being supported by section 6'.

According to another embodiment of the present invention shown in FIGS. 11 to 14 and to be regarded as being the currently preferred embodiment of group 1 for bead releasing and disassembling a tire 2, between arm 6 and movable carriage 4 a driving means 33 is provided designed to set in rotation arm 6 synchronously about the two axes x—x and y—y. More particularly, driving means 33 comprises a support structure 34 fixed to movable carriage 4 and a motor-reduction unit assembly 35 carried by the support structure 34. The motor-reduction unit 35 has an output shaft 36 that is connected in a crank like fashion (90°) to the adjacent hollow end of the upright or arm 6 with the possibility of being rotated therein—FIG. 13.

Moreover, a pair of bevel gears are provided for transmitting the lifting motion of arm 6 with respect to carriage or slide 4, which comprise two gears 40 and 41 in meshing engagement with each other, gear 40 being rigidly fixed to support structure 34 coaxially with output shaft 36 which crosses it and can freely rotate with respect thereto, whereas the second gear 41 is fixed (e.g. welded to an end thereof) and concentric to the hollow end portion of arm 6 and free to rotate with respect to crankshaft 36 inserted therein.

Figure 14:
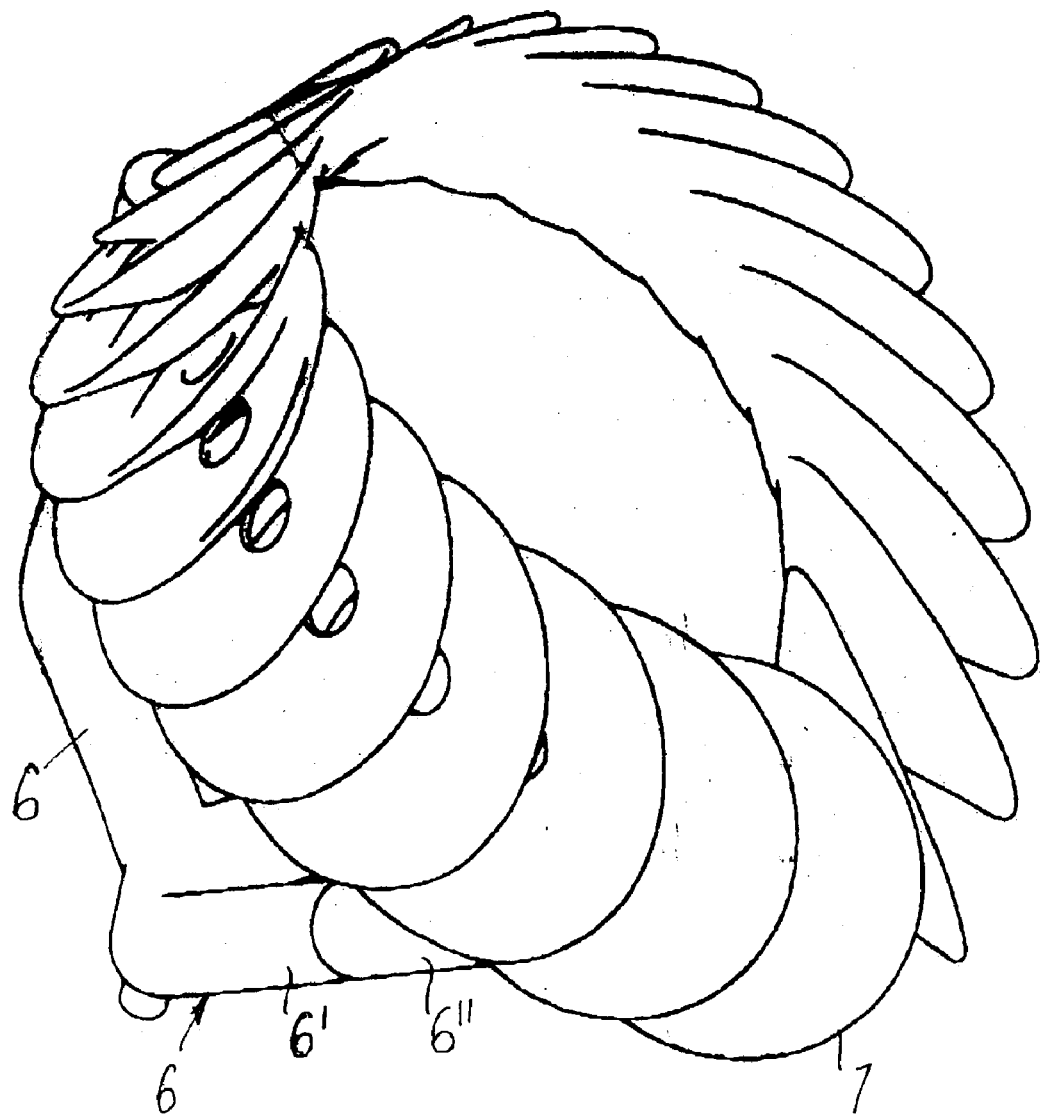
FIG. 14 shows a sequence of images showing the path followed by a tool carrying arm, and more particularly the path of a bead releasing disk carried by the said arm while being moved from one front of the tire to the other by overtaking it.

Gears 40 and 41 meshing with each other have toothings with a predetermined transmission ratio to cause a bidirectional composite movement of arm 6 with respect to tire 2 and wheel-rim 3, as diagrammatically shown in the sequence of FIG. 14.

The movable carriage 4 is caused to be displaced to and fro in front of tire 2 along guides 5 by means of a linear actuator, e.g. comprising a double-acting jack 42.

The operation of a group or apparatus 1 for bead releasing and disassembling a tire 2 from a respective wheel-rim 3 locked onto a self-centring device of a tire disassembling machine according to the embodiment shown in FIGS. 1 to 10 is quite simple. Upon control of the operator, actuator 42 causes the carriage 4 to be displaced to such an extent as to cause arm 6 and the active edges 107 of the bead releasing disk 7 to be displaced to one side, e.g. side 11, of tire 2 mounted on wheel-rim 3, from which it is to be disassembled. To this end, the wheel-rim is mounted for rotation on a mandrel of a tire disassembling machine in such a way that the wheel-rim itself preferably lies on a substantially vertical plane, i.e. with its horizontal axis of rotation, parallel to guides 5.

Should the need arise, by energizing linear actuator 26, the operator adjusts the length of arm 6 with respect to the diameter of wheel-rim 3, in such a way that the working front 107 of the bead releasing disk is brought into abutment against the bead of tire 2.

With the continuing thrusting action exerted by linear actuator 42, the bead releasing disk urges the tire bead to be released from the outer edge of the wheel-rim and to be flexed towards the inward raceway 203 of the wheel-rim. The operator then sets in rotation the self-centring device supporting wheel-rim 3 in such a way as to allow the bead releasing tool 7 to take its bead releasing action to completion along the whole outer edge of the wheel-rim.

Then, the operator controls the removing tool 208 to extend outwards (FIG. 1) or else he positions the removing tool against the bead removing tool 7 (FIG. 2) so that the removing tool can be urged, still under the action exerted by the actuator 42, to cause its own working edge 108 to be inserted between the outer edge of the wheel-rim 3 and the bead of tire 2 which is now fully released. Carriage 4 is then slightly withdrawn whereby the bead engaged by edge 108 of the extracting tool 8 is dragged towards the outside of the wheel-rim 3, thus overtaking or stepping/popping over the adjacent outer edge thereof.

The operator sets once again in rotation the self-centring device supporting the wheel-rim 3 to such an extent that the removing tool 8 has completed its extracting or removing action along the whole circumference of the tire bead 2 that is thus completely removed or disassembled from wheel-rim 3.

One then proceeds to act on the opposite side 12 of the wheel-rim. To this end, after arm 6, and thus tool 8 and bead releasing disk 7, have been removed from side 11, both the motor-reduction unit 21 and the motor-reduction unit 24 are energized, preferably in a substantially synchronous way, to control rotation of arm 6 about the two perpendicular axes x—x and y—y.

Rotation of arm 6 about its own longitudinal axis x—x occurs owing to worm screw 16 or rack 18 which controls gear 17 or pinion 22 that is rigid in rotation with the lower end or base 106 of arm 6. Rotation of arm 6 about axis y—y occurs due to the driving shaft 25 rigid in rotation with sleeve 13. The combination of the two rotary movements and the synchronous displacement of the mobile carriage 4 along guides 5 for a stroke whose length is slightly greater than the width of tire 2 towards side 12, causes arm 2 to follow a path overtaking tire 2 with positioning at the same time of the working edges 107 and 108 of the bead releasing disk 7 and of the removing tool 8 facing the side 12 of tire 2.

At this stage, the operator repeats the operating sequence followed at side 11 except for the extraction operation that, instead of being accomplished by traction of the second bead of the tire, is achieved by thrust onto it so that it is pushed to overtake the outer edge of the wheel-rim on side 11. More particularly, the transverse thrusting action exerted by the bead releasing disk 7 against the second bead of the tire 2 urges it inside the central raceway 203 of the wheel-rim 3 thereby causing it to become loose. In such a condition, removing tool 8 can be inserted with its active edge 108 between the tire bead and the edge of wheel-rim 3. The transverse thrusting action is further prosecuted by the actuator 42, whilst the operator sets in rotation the self-centring device, thereby causing progressive removal of the second bead of tire 2 on side 11 of wheel-rim 3 from where the first bead was previously extracted or removed. At that stage, removing tool 8 acts as a slide chute and as a lever also of the second bead to overtake the peripheral edge 200, thus completing the disassembling of tire 2 from wheel-rim 3.

As it will be noted, by the bead releasing and tire disassembling group according to the present invention the further and necessary step of repositioning the removing tool 8 after each intervention of the bead releasing disk to position the removing tool so as to be facing tire 2, as it was instead necessary with the prior art bead releasing and tire disassembling assemblies.

Group 1 for bead releasing and disassembling a tire 2 from a wheel-rim 3 according to the embodiment shown in FIGS. 11 to 14 operates in a substantially similar way to that described above. Only the overtaking path with respect to tire 2 of arm 6 is different.

Such a path is followed by setting in rotation shaft or pin 36, the crank or throw section of which inserted into arm 6 causes the arm 6 to rotate about axis y—y of shaft 36, whereas arm 6 is caused to rotate about its longitudinal axis x—x by the bevel gear pair 40, 41 and the carriage or slide 4 is possibly displaced along guides 5.

Figure 7:
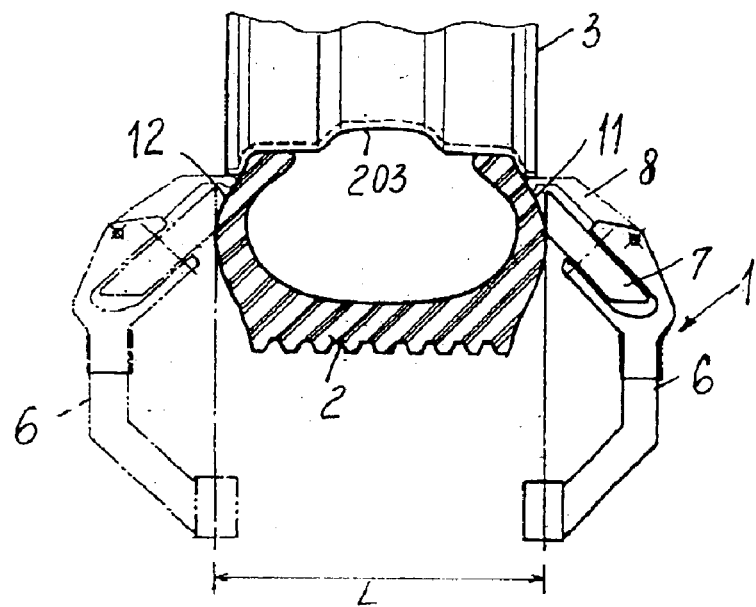
FIG. 7 shows the dimensions of a bead releasing and removing group according to the present invention on both sides of a wheel-rim on which a tire is mounted whose bead is to be released and removed.
Figure 3:
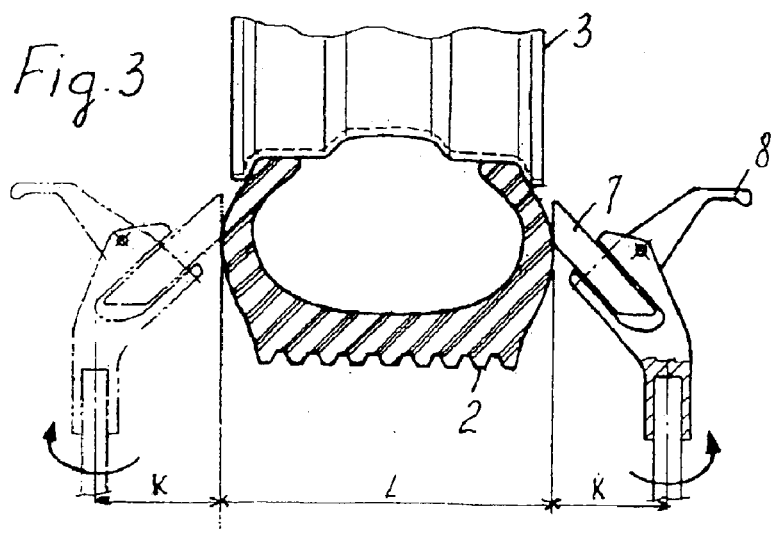
FIG. 3 is a front view, partly in cross-section, of a bead releasing group of a conventional type.

It was found in practice that the above described invention accomplishes the objects set forth above. In particular, as shown in FIG. 7, an advantageous and remarkable reduction of the operating encumbrances required by the bead releasing and tire disassembling group 1 is obtained, with respect to a prior art assembly such as that shown in FIG. 3 which requires substantial free space on both sides of the tire 2 to cause the tool-carrying head 7,8 to be rotated about the axis of pole 6 to turn first one tool and then the other towards the tire, which rotation is no longer necessary for group 1 according to the present invention.

Assembling operations for a tire 2 are carried out only by using removing tool 8.

The invention described above is susceptible to numerous modifications and variations without departing the scope of the present invention as defined by the claims. Thus, for example, driving means 9 and 10 can be controlled by a control unit 910 (FIG. 9) designed to control their enabling/disabling sequence.

What is claimed is:

1. An apparatus for assembling, disassembling and bead releasing of a tire onto and from a wheel-rim carried on a support mounted for rotation about an axis, comprising at least one carriage means displaceably mounted on guides extending parallel to the axis of rotation of said wheel-rim, an arm extending in a transverse direction with respect to said axis of rotation and having one end thereof supported by said carriage means and its other end provided with a bead releasing tool, wherein said bead releasing tool is arranged so as to have its working front facing, in use, towards said wheel-rim on said support, and further comprising first driving means designed to cause said arm to rotate about a longitudinal axis to position said bead releasing tool with respect to the sides of said tire, and second driving means designed to cause said arm to rotate about at least one axis extending transversely to said longitudinal axis thereby alternately lifting and lowering, upon control, said bead releasing tool with respect to said wheel-rim or tire in sequence with respect to the displacement of said carriage means along said guides to induce the tire bead to step or pop over said wheel-rim or tire.

2. An apparatus according to claim 1, wherein said first and second driving means comprise a control unit designed to actuate said first and second driving means in sequence.

3. An apparatus according to claim 1, wherein said first driving means comprises a support element for said arm which is mounted for rotation about said longitudinal axis on said carriage means, a receiving structure carried by said support, a motor-reduction unit seated in said receiving structure, and a motion transmission connection to said arm.

4. An apparatus according to claim 3, wherein said motor-reduction unit assembly comprises a reversible motor and a reduction unit having a driving element and a driven element rigid in rotation with said arm.

5. An apparatus according to claim 4, wherein said driving element comprises a worm screw.

6. An apparatus according to claim 4, wherein said driving element comprises a rack and a linear actuator for said rack.

7. An apparatus according to claim 5, wherein said driven element is a gear in meshing engagement with said worm screw.

8. An apparatus according to any claim 1, wherein said second driving means comprises a support structure fixed to said carriage, a reversible motor carried by said support structure, and an output shaft of said reversible motor which extends parallel to said transverse axis and is rigid in rotation with said support element.

9. An apparatus according to claim 1, wherein said arm extending transversely to the said axis of rotation comprises at least two telescopic sections and driving means designed to cause controlled variations in length of said arm.

10. An apparatus according to claim 9, wherein said driving means comprises at least one fluid operated jack having one end thereof connected to one section and another end articulated to the other section.

11. An apparatus according to claim 9, wherein said driving means comprises at least one rack rigid with one of said sections, a pinion gear in meshing engagement with said rack and a reversible motor-reduction unit designed to rotate said pinion gear.

12. An apparatus according to claim 3, wherein one end of said arm is mounted for rotation on said support element and is connected to said arm through a double crank portion.

13. An apparatus according to claim 1, wherein said second driving means comprises a support member fixed to said movable carriage or slide, a reversible motor-reduction unit assembly carried by a support and provided with an output shaft connected to said arm in a crank-like fashion, a first pinion gear fixed to said support member and arranged coaxially about said output shaft, and a second pinion gear in meshing engagement with said first pinion gear and rigid in rotation with one end of said arm transversely extending with respect to said output shaft.

14. An apparatus according to claim 13, wherein said arm is connected in a crank-like fashion to said end rotatably connected to said output shaft in a crank-like fashion.

15. An apparatus according to claim 1, wherein said bead releasing tool comprises a bead releasing disk idly mounted about an axis inclined with respect to said arm and a removing or extracting tool.

16. An apparatus according to claim 15, wherein said removing tool is slidably supported at a distal end from said arm and is displaceable between an outwardly extended working position and a withdrawn rest position.

17. An apparatus according to claim 6, wherein said driven element is a gear in meshing engagement with said rack.

* * * * *